3,222,396
PROCESS FOR THE PREPARATION OF 4-HALO-
BUTANE-1-SULFONYL HALIDES
Robert E. Williams, Sherman Oaks, Calif., assignor to
Rexall Drug and Chemical Company, Los Angeles,
Calif., a corporation of Delaware
No Drawing. Filed Apr. 16, 1962, Ser. No. 187,910
4 Claims. (Cl. 260—543)

This invention relates to an improved process for the preparation of compounds known in the art of chemistry as sulfonyl halides.

The invention sought to be patented is described as residing in a process for the preparation of a 4-halobutane-1-sulfonyl halide wherein tetrahydrofuran is treated with thiourea in the presence of aqueous hydrohalic acid and the product of this reaction is treated with a halogen.

The 4-halobutane-1-sulfonyl halides prepared by the process of this invention are valuable chemical intermediates which can be reacted with tertiary amines to prepare quaternary germicidal and fungicidal compounds. In addition, reaction with 4-aminobenzenesulfonamide results in the preparation of N-(4-sulfonamido)-butane sultam which has valuable activity as an anticonvulsant agent.

The manner and process of carrying out and using this invention will now be described to enable a person skilled in the are of chemistry to carry out and use the same as follows:

The preparation of 4-halobutane-1-sulfonyl halides is illustrated by the following equations:

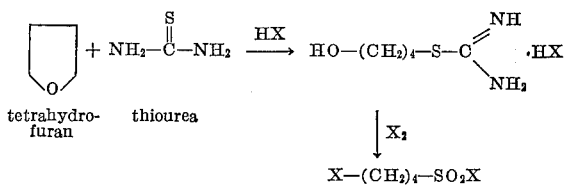

tetrahydro-   thiourea
furan in which X is a halogen, for example chlorine or bromine.

The starting material tetrahydrofuran, also known in the art of chemistry as "tetramethylene oxide," as well as thiourea and other materials used in carrying out the process of the invention are all well-known compounds that are readily obtainable commercially.

In a preferred embodiment of this invention, tetrahydrofuran and thiourea in substantially equimolar proportions are placed in a reaction vessel in the presence of aqueous hydrochloric acid.

The reaction mixture is heated under reflux until the formation of the S-(4-hydroxybutyl)-isothiourea hydrochloride intermediate is complete, normally requiring about 2 to 20 hours. The completion of the reaction is indicated by an increase in the temperature of the refluxing mixture.

Alternately, tetrahydrofuran is dissolved in aqueous hydrochloric acid and placed in a reaction vessel. The solution is refluxed for about 5 minutes to 2 hours and a solution of thiourea in aqueous hydrochloric acid is then slowly added to the refluxing solution over a period of up to about 6 hours. Refluxing is continued until the formation of the S-(hydroxybutyl)-isothiourea hydrochloride intermediate is complete, as indicated by an increase in the temperature of the refluxing solution.

At the conclusion of the reaction, the mixture is cooled to approximately 5° C. and chlorine gas is introduced until the solution turns yellow indicating an excess of chlorine.

Alternately, the solution containing the S-(hydroxybutyl)-isothiourea hydrochloride is first distilled to remove excess tetrahydrofuran and water followed by cooling to 5° C. and treating with chlorine gas.

The temperature of the mixture during chlorination is maintained at between about 0 and about 10° C.

The 4-chlorobutane-1-sulfonyl chloride product is recovered by extraction with a halogenated hydrocarbon solvent such as chloroform or methylene chloride. The resulting extract is then treated with a reducing agent, for example, cold bisulfite solution, to remove excess chlorine, dried, for example over anhydrous sodium sulfate and sodium carbonate, filtered and the extracting solvent removed by distillation. The liquid 4-chlorobutane-1-sulfonyl chloride is obtained in yields of between 75 and 90%.

In carrying out the process according to this invention the S-(hydroxybutyl)-isothiourea hydrochloride may, if desired, be isolated and purified before chlorination. The preferred process, however, is to carry out the chlorination directly in the reaction medium without isolation of the intermediate.

While the above process has been specifically described with respect to the use of HCl and Cl₂ to form a chlorinated product, HBr and Br₂ are the full equivalents thereof and their use in the process as described hereinabove results in the formation of 4-bromobutane-1-sulfonyl bromide having the same utility as 4-chlorobutane-1-sulfonyl chloride.

The best mode contemplated by the inventor of carrying out this invention will now be set forth as follows:

*Example 1*

100 ml. tetrahydrofuran (88.8 grams, 1.23 moles), 100 ml. of aqueous hydrochloric acid (1.17 moles, 12 N), 76 grams (1.0 mole) thiourea and 100 ml. water are placed in a reaction vessel and heated under reflux for 16 hours.

After the reflux cycle, the condenser is changed to a distillation position and the solution heated and the distillate removed until the temperature reaches 104° C.

The solution is then cooled to 5° C. and chlorine gas bubbled through the solution until it becomes yellow. The temperature throughout chlorination is kept at 0–10° C. Approximately 220 grams of chlorine are required.

The cold mixture is transferred to a separatory funnel and extracted with 100 ml. of chloroform. The lower chloroform layer is withdrawn, washed first with cold bisulfite solution until free of residual chlorine and then with a cold 20% aqueous sodium chloride solution.

The chloroform extract is then dried over a mixture of anhydrous sodium sulfate and sodium carbonate and filtered free of salts. Evaporation to remove chloroform yields 149.5 grams (78%) of 4-chlorobutane-1-sulfonyl chloride.

*Example 2*

100 ml. (1.17 moles) aqueous hydrochloric acid (12 N) and 100 ml. of tetrahydrofuran (88.8 grams, 1.23 moles) are placed in a 500 ml. 3-neck round-bottom flask fitted with a stirrer, addition funnel and condenser. The solution is heated under reflux, with stirring for 15 minutes. Thiourea (76 grams, 1.0 mole) in 200 ml. of aqueous hydrochloric acid (6 N) is then slowly added to the refluxing solution over a 4 hour period. The temperature during addition gradually reaches 78° C. Upon completion of the addition the reaction solution is heated under reflux an additional 16 hours.

The solution is then cooled to 5° C. and chlorinated and the 4-chlorobutane-1-sulfonyl chloride recovered as described in Example 1. Yield is 163 grams (85%).

The method of this invention is characterized by high yields and simple manipulative steps, thus representing a marked improvement over prior art processes for the production of 4-halobutane-1-sulfonyl halides. Moreover, the product obtained has an unusually high purity. Thus, reaction of the product with 4-aminobenzenesulfonamide results in the preparation of N-(4-sulfonamido)-butane sultam which itself has the high purity necessary for pharmaceutical applications.

The subject matter which the applicant regards as his invention is particularly pointed out and distinctly claimed as follows.

I claim:

1. A process of preparing 4-chlorobutane-1-sulfonyl chloride which comprises treating an aqueous solution of S-(4-hydroxybutyl)-isothiourea hydrochloride with chlorine gas at a temperature of about 0° C. to about 10° C. and recovering the product from the reaction mixture.

2. A process of preparing 4-chlorobutane-1-sulfonyl chloride which comprises refluxing tetrahydrofuran with thiourea in an aqueous hydrochloric acid medium, treating the reaction product in situ with chlorine gas at a temperature between about 0° C. and about 10° C. and recovering the product from the reaction mixture.

3. A process according to claim 2 wherein the reaction mixture after treatment with chlorine is extracted with a halogenated hydrocarbon solvent and 4-chlorobutane-1-sulfonyl chloride is recovered from the extract.

4. A process of preparing 4-chlorobutane-1-sulfonyl chloride which comprises refluxing an aqueous hydrochloric acid solution of tetrahydrofuran for about 5 minutes to about 2 hours, adding an aqueous hydrochloric acid solution of thiourea to the mixture over a period of up to about 6 hours while maintaining the mixture under reflux, continuing to reflux the mixture until a rise in temperature occurs, treating with chlorine at a temperature of about 0° C. to about 10° C., and recovering the product from the mixture.

References Cited by the Examiner

UNITED STATES PATENTS

| | | | |
|---|---|---|---|
| 2,146,744 | 2/1939 | Johnson | 260—543 |
| 2,147,346 | 2/1939 | Johnson | 260—543 |
| 2,275,378 | 3/1942 | Johnson | 260—543 |
| 2,459,440 | 1/1949 | Lieber | 260—543 XR |
| 2,483,499 | 10/1949 | Lieber | 260—543 XR |
| 2,623,069 | 12/1952 | Wilkes | 260—543 |

OTHER REFERENCES

Blatt: "Organic Syntheses," coll. vol II, pp. 571–572 (1955).

Johnson et al.: "J. Am. Chem. Soc.," vol. 58 (1936), pp. 1348–1352.

Sprague et al.: "J. Am. Chem. Soc.," vol. 59 (1937), pp. 1837–1840.

LORRAINE A. WEINBERGER, *Primary Examiner.*

CHARLES B. PARKER, *Examiner.*